United States Patent [19]

Mostyn et al.

[11] Patent Number: 4,652,808
[45] Date of Patent: Mar. 24, 1987

[54] EFFICIENCY SWITCHING VOLTAGE CONVERTER SYSTEM

[75] Inventors: Graham Y. Mostyn, Saratoga; Mohammad Yunus, Fremont, both of Calif.

[73] Assignee: Intersil, Inc., Cupertino, Calif.

[21] Appl. No.: 615,353

[22] Filed: May 30, 1984

[51] Int. Cl.$^4$ .............................................. G05F 1/46
[52] U.S. Cl. .................................... 323/222; 323/299; 323/351; 363/21
[58] Field of Search ............... 323/222, 285, 299, 351; 363/21

[56] References Cited

U.S. PATENT DOCUMENTS 4,536,700  8/1985  Bello et al. ........................ 323/285

FOREIGN PATENT DOCUMENTS 2519786  7/1983  France ................................ 323/222
56-87117  7/1981  Japan .................................. 323/222

OTHER PUBLICATIONS

Redl and Sokal, "Switching-Mode Power Converters: Optimizing Dynamic Behavior with Input and Output Feed-Forward and Current Mode Control", Seventh National Solid-State Power Conversion Conference and Exhibit, Mar. 25-27, 1980.

Primary Examiner—Philip H. Leung
Attorney, Agent, or Firm—Stanley C. Corwin; Mark Mollon

[57] ABSTRACT

Disclosed is an improved efficiency switching voltage converter system wherein the semiconductor switching device employed therein is provided with increased gate drive by selectively applying the most effective driving voltage available in the system.

10 Claims, 5 Drawing Figures

EFFICIENCY SWITCHING VOLTAGE CONVERTER SYSTEM

BACKGROUND OF THE INVENTION

1. Field of the Invention

This invention relates to switching voltage converter systems for converting a D.C. input voltage to a different D.C. output voltage. In particular, this invention relates to switching voltage converter systems employing semiconductor switches.

2. Background of the Invention

Switching voltage converter systems are employed in many applications and, in particular, are employed in D.C. applications to convert an input voltage $V_{IN}$ to a different D.C. output voltage $V_{OUT}$ by means of a switching action in the system. In one type of converter system, the voltage change results from the induced voltage in an inductor due to the time variation of the current through the inductor due to the switching action. The operation of such switching converters is well known in the art with the basic configuration of a prior art switching converter system for stepping up the voltage being shown in FIG. 1.

The switching means employed in modern switching voltage converter systems is commonly a semiconductor switch such as a MOSFET, JFET or bipolar transistor or similar semiconductor device. Such semiconductor switches typically employ appropriate switching logic for turning the switch on and off as desired by applying the appropriate drive signal to the semiconductor device. A step up switching voltage converter system employing an n-channel MOSFET switch and suitable switching logic for driving the switch gate is shown in FIG. 2. In various applications the semiconductor switch and the switching control logic may be discrete circuits or form a part of a single monolithic IC semiconductor chip.

The efficiency of switching voltage converter systems is, in general, dependent upon the power losses in the circuit elements. In particular, power losses in the switch can have a significant effect on the efficiency of such converter systems. Where the switch of the system operates in a normal voltage range, the power loss in the switch will in general be lower where the forward voltage drop across the switch is minimized. The specific reduction in power loss by reducing the voltage drop across the switch and the corresponding increase in efficiency depends on the specific type of semiconductor device employed as the switch and the specific voltage range at which the system is operating.

The forward voltage drop across a semiconductor switch will typically be dependent upon the characteristics of both the switch device itself and the drive signal applied to the switch. In many prior art switching voltage converter systems, the switching logic which supplies the switch drive signal is powered by the input voltage $V_{IN}$. For example, a MOSFET switch driven from the input voltage $V_{IN}$ supplied to the switching logic is shown in the prior art switching converter system of FIG. 2.

For a given operating region of a MOSFET switch, such as the switch shown in FIG. 2, the voltage drop across the switch can be reduced by increasing drive voltage between the gate and source ($V_{GS}$) of the switch when it is on, the specific relationship depending on the particular switch design and operating range, and other device characteristics. This is also true for other FET switches and bipolar transistor switches (although in the latter case the voltage drop is reduced by increasing the current drive signal to the transistor base by increasing the voltage). The device characteristics of the semiconductor switch, although affecting the voltage drop across the switch, are generally not under the control of the circuit designer as this depends on the particular fabrication process used for the specific semiconductor switch. However, one device characteristic which typically is under the designers' control is the size of the transistor switch, with the voltage drop across the switch in general decreasing with increasing semiconductor switch size. More specifically, for a MOSFET switch, the voltage drop across the switch will be inversely proportional to the ratio of the device channel width to length. Making a switch very large is however undesirable for economic and space considerations.

SUMMARY OF THE INVENTION

Accordingly, it is an object of the present invention to provide an improved efficiency switching voltage converter system having reduced power losses in the switch by increasing the drive signal to the switch during operation of the system.

It is a further object of the present invention to provide a switching voltage converter system of a reduced size with no loss in system efficiency.

The above and other objects are accomplished in a switching voltage converter system in accordance with the present invention in which the drive signal to the semiconductor switch of the system is a function of either the input or output voltage of the system to maximize the drive signal. The particular means for implementing the present invention varies with the specific switching voltage converter topology to which it is being applied. In a simple embodiment of the present invention, a voltage drive to the switch or switching logic is provided from both the voltage input and voltage output. In an alternative embodiment, the input voltage and output voltage are sampled by comparison means which provides the greater of these to the switch by turning on the appropriate one of two semiconductor devices. In an application where the output voltage is negative, i.e., in a switching voltage inverter application, the more negative of the output voltage and ground will be supplied to drive the switch.

DESCRIPTION OF THE PREFERRED EMBODIMENT

Switching voltage converter systems are employed in a wide variety of applications, and in particular DC applications, to convert an input voltage $V_{IN}$ to a different output voltage $V_{OUT}$. Many different uses are possible for such systems, and $V_{OUT}$ may be greater than (step up converter), less than (step down) or inverted (inverter) in relation to $V_{IN}$. Furthermore, for each type of converter many different circuit topologies are possible.

Figure 1:
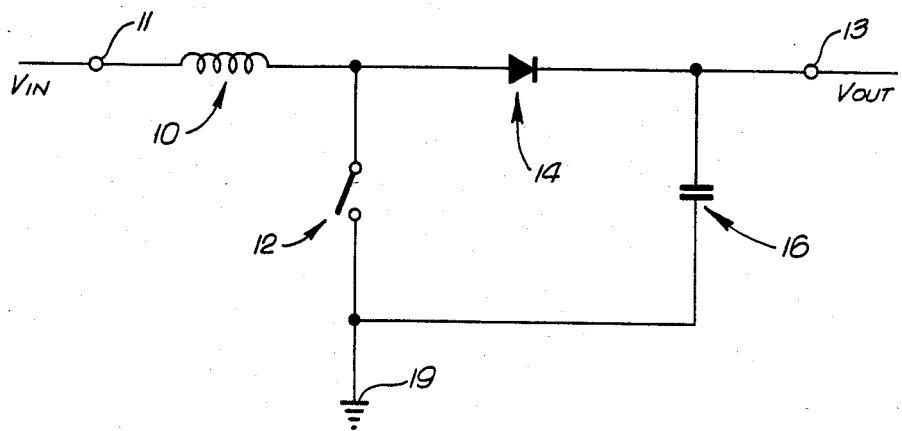
FIG. 1 is a schematic drawing of a simple prior art step up switching voltage converter.

The basic operation of switching voltage converter systems is well known in the art and will only be briefly reviewed. FIG. 1 shows a simple prior art step up switching voltage converter for converting an input voltage $V_{IN}$ received at the voltage input 11 to an output voltage $V_{OUT}$ provided to the voltage output 13. The system of FIG. 1 employs an inductor 10 through which current flows to system ground 19 when switch 12 is closed. Since the input is effectively coupled to system ground 19 through the inductor 10 when switch 12 is closed, the current $i_L$ through inductor 10 will be relatively high. Opening switch 12 interrupts current flow through the low resistance path to system ground 19 and current flows substantially only through diode 14 into capacitor 16 and to voltage output 13. Immediately after switch 12 opens, the current flow through inductor 10 will begin to decrease due to the increased resistance of the circuit path through diode 14. This current change in inductor 10 results in an induced voltage in inductor 10 proportional to $Ldi_L/dt$ (where L is the inductance of inductor 10). The sign of the induced voltage is additive to $V_{IN}$ resulting in $V_{OUT}$ being greater than $V_{IN}$ (ignoring the voltage drop across diode 14). The function of capacitor 16 is to maintain $V_{OUT}$ during the period switch 12 is closed and thereby smooth the value of output voltage $V_{OUT}$.

Figure 2:
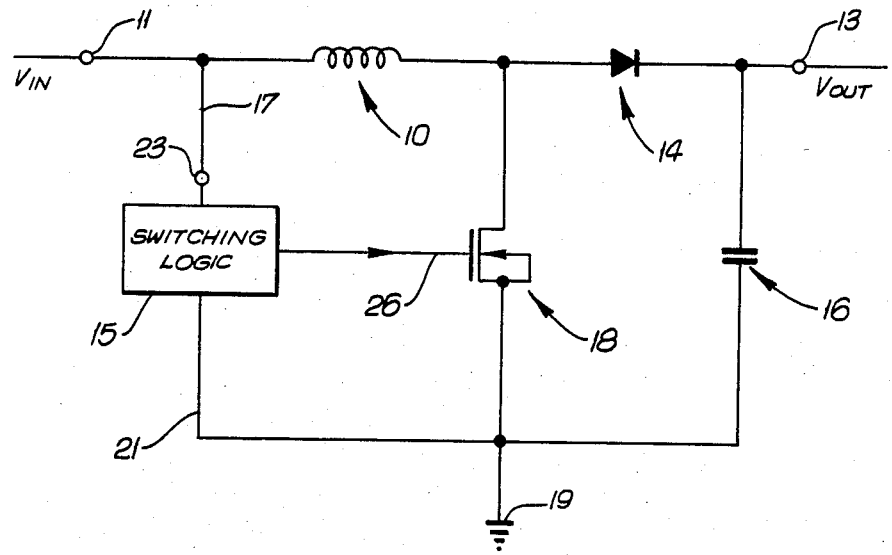
FIG. 2 is a schematic diagram of a prior art step up converter system employing an n-channel MOSFET as the converter switch.

FIG. 2 shows the step up switching voltage converter of FIG. 1 employing a semiconductor switch 18 in conjunction with appropriate switching logic 15 to accomplish the switching function. The specific semiconductor switch 18 shown in FIG. 2 is an n-channel enhancement MOSFET, a form of semiconductor switch commonly used in switching voltage converter systems. Other types of semiconductor switches such as JFET, bipolar transistors or triacs may also be employed, however. The specific switching logic 15 employed may also take a variety of forms well known in the art. For example, commercially available IC switching logic such as Texas Instruments model TL 497 switching regulator circuit or Raytheon Semiconductor model RC 4193 NB switching regulator circuit are suitable. The specific form of switching logic does not affect the substance of the present invention.

As shown in FIG. 2, in the prior art switching voltage converter system, the drive signal to the semiconductor switch 18 is supplied from switching logic 15. More specifically, the drive voltage between the gate and source of the MOSFET switch 18 is provided by the switching logic 15. Switching logic 15 in turn is driven by $V_{IN}$ supplied along conductive line 17 to logic input 23 during start up of the system and thereafter. Switching logic 15 is also coupled to system ground 19 by line 21. The drive voltage supplied to MOSFET switch 18 by switching logic 15 is typically limited by the magnitude of $V_{IN}$. For the purposes of explanation, the details of the switching logic 15 may be ignored and it may be treated as simply selectively providing the signal received along line 17 to line 26 to drive switch 18.

Figure 3:
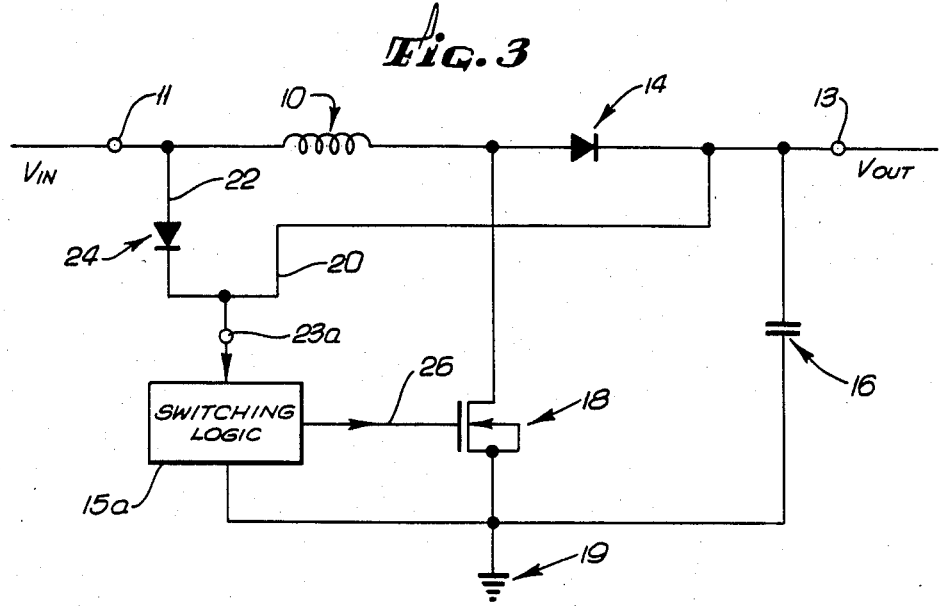
FIG. 3 is a schematic diagram of a simple embodiment of the present invention in a step up switching voltage converter.

FIG. 3 shows a simple embodiment of the present invention employed in a step up switching voltage converter of the type shown in FIG. 2. The embodiment shown in FIG. 3 adds a line 20, coupling the voltage supply input 23a of switching logic 15a to $V_{OUT}$, and line 22 and diode 24, in place of the direct connection of $V_{IN}$ to the switching logic 15a. In this embodiment, the switching logic 15a may be identical to or may differ from the switching logic 15 of FIG. 2, in accordance with the requirements of the particular application.

Basic circuit theory shows that lines 20 and 22 will thus provide to the switching logic 15a the greater of $V_{OUT}$ or $V_{IN}$ (less the voltage drop across diode 24) which will in turn drive switch 18. Diode 24 is provided to prevent reverse current flow along line 22 when $V_{OUT}$ exceeds $V_{IN}$. Since the embodiment illustrated in FIG. 3 is in a step up converter application, $V_{IN}$ will generally exceed $V_{OUT}$ only during start up. Thereafter, $V_{OUT}$ will exceed $V_{IN}$ (possibly by a large factor) and will drive switch 18, through switching logic 15a.

Providing the greater of $V_{IN}$ and $V_{OUT}$ to the switching logic 15a and thereby to drive the semiconductor switch 18, allows significant gains in circuit efficiency with an easily implemented modification of the switching voltage converter circuit. In particular, where the semiconductor switch 18 is discrete from the switching logic 15a, the embodiment of FIG. 3 may provide significant increases in the efficiency of the switching voltage converter system with a straightforward design modification. This increase in efficiency results from the device characteristic of FET switches that, in the normal operational region of the transistor, increasing the drive voltage between the gate and source will reduce the voltage drop across the switch. This reduction in voltage drop across the switch will, for operation in the normal voltage range for the switch, reduce the power loss in the switch. The specific percentage change in efficiency which results from a configuration such as in FIG. 3 will depend on the specific values of $V_{IN}$ and $V_{OUT}$ and the specific device characteristics of semiconductor switch 18. Preliminary indications, however, indicate that improvements in efficiency as high as 50% may be achieved for certain applications of the present invention as shown in FIG. 3.

Figure 4:
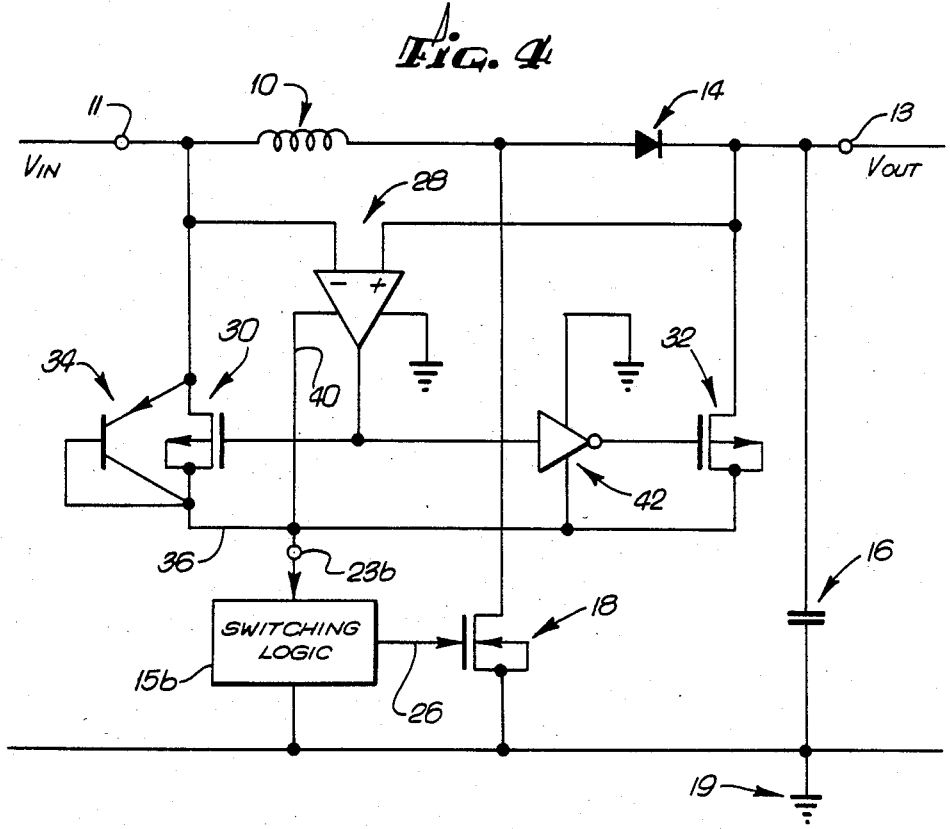
FIG. 4 is a schematic diagram showing an alternate embodiment of the present invention in a step up switching voltage converter.

FIG. 4 shows an alternate embodiment of the present invention still in the context of a step up switching voltage converter system. The embodiment shown in FIG. 4 employs a comparator 28 in conjunction with two (2) semiconductor switch devices 30, 32 to provide respectively the greater of $V_{IN}$ and $V_{OUT}$ to semiconductor switch 18. The embodiment shown in FIG. 4 although more complex than that shown in FIG. 3 will in general be capable of further increasing the efficiency of the step up switching voltage converter system during start up. This additional efficiency increase is due to the capability of substantially reducing the forward voltage drop across first semiconductor device 30 compared to that of the diode 24 shown in FIG. 3. Therefore, during start up of the switching voltage converter, the voltage supplied to the gate of semiconductor switch 18 will be greater by the corresponding difference in voltage drops.

A second advantage of the alternate embodiment shown in FIG. 4 is the possibility of fabricating the entire switching voltage converter, with the exception of the inductor 10, diode 14 and capacitor 16 on a single CMOS integrated circuit chip. Therefore, while somewhat more complex than the embodiment in FIG. 3, in applications where a monolithic IC design is suitable, the embodiment in FIG. 4 can in general be more advantageous. In such applications, however, special consideration must be given to maintaining the p-channel substrates at the correct potential.

Referring to FIG. 4, the specific embodiment is shown employing a MOSFET semiconductor switch 18 and MOSFETs 30, 32. JFET or bipolar semiconductor switches can be used, however, with the appropriate design changes. During start up of the switching voltage converter system, $V_{IN}$ will be the most positive potential in the circuit and would be the desired driving potential for semiconductor switch 18. At this time, parasitic transistor 34, shown explicitly in FIG. 4 across MOSFET 30 in a diode connected form, will be forward biased by $V_{IN}$. (Transistor 34 is characterised as parasitic due to its natural presence in the fabrication of a MOSFET. Although in normal applications the parasitic transistor is inactive and not explicitly shown, in this particular application it is active during start up of the system and therefore is shown explicitly across MOSFET 30). Parasitic transistor 34 activated in the diode connected form thus passes current along line 36 at the potential $V_{IN}$ less the diode voltage drop across parasitic transistor 34. This voltage is supplied along line 36 to the switching logic 15b and to the gate of switch 18 and along line 40 to provide power to comparator 28. At this point, comparator 28 is activated and will switch first MOSFET 30 on and, via inverter 42, MOSFET 32 off. As MOSFET 30 switches on, current is supplied to switching logic 15b along line 36 to input 23b and thereby, via switching logic 15b, to switch 18 at the potential $V_{IN}$ less the relatively small voltage drop across MOSFET 30. In a monolithic CMOS IC application, this potential will be supplied to the appropriate p-channel substrates of the IC chip containing the MOSFET 30, comparator 28, MOSFET 32, inverter 42, switching logic 15b and switch 18.

As the switching voltage converter system begins operating $V_{OUT}$ will rise above $V_{IN}$ at which point comparator 28 will turn off MOSFET 30 and turn on MOSFET 32. When MOSFET 32 has been turned on the switching logic 15b and switch 18 will thus be supplied with $V_{OUT}$ less the relatively small voltage drop across MOSFET 32. In a monolithic CMOS IC implementation embodiment this voltage will be supplied to the appropriate p-channel substrates thereby providing maximum gate to source voltage to all MOSFET circuit elements, and in particular to MOSFET switch 18.

Figure 5:
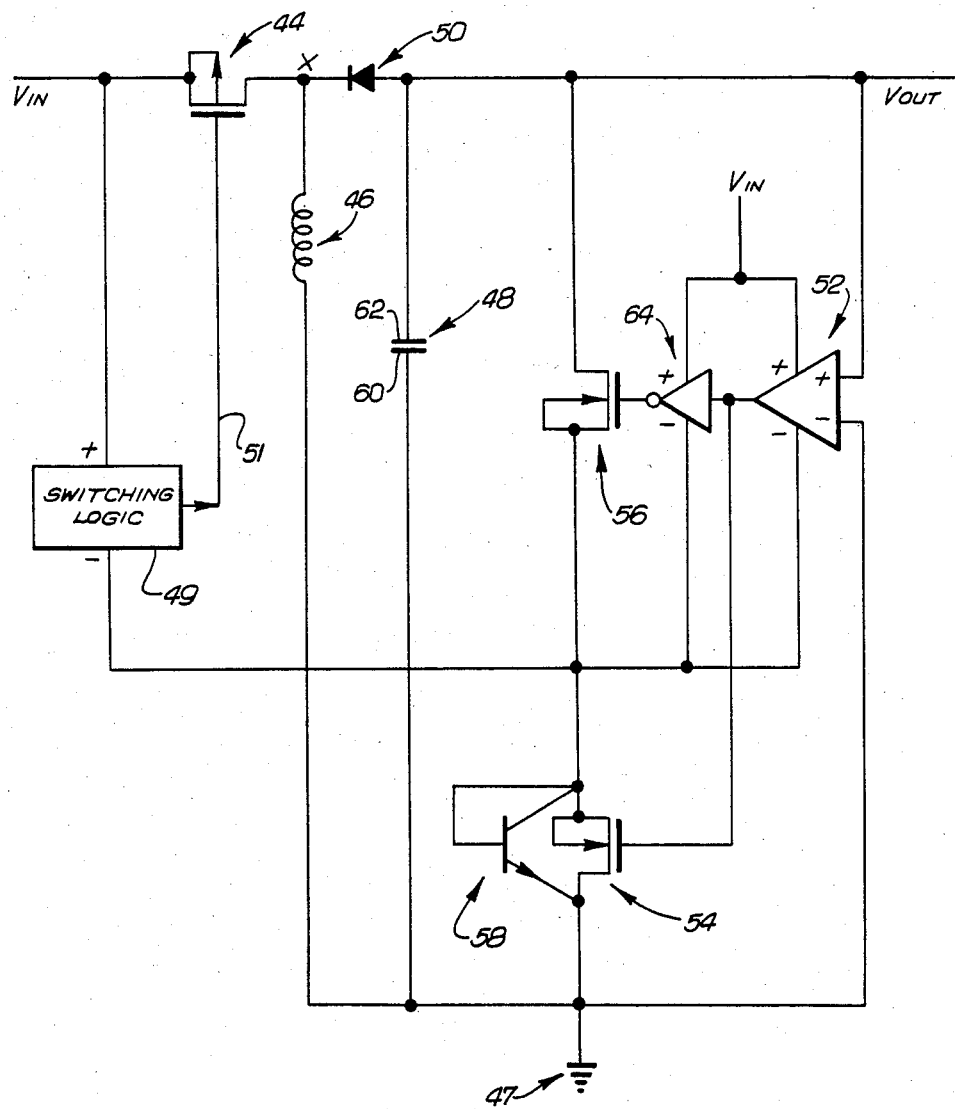
FIG. 5 is a schematic diagram showing still another alternate embodiment of the present invention in an inverting switching voltage converter.

FIG. 5 shows another embodiment of the present invention in an application of a switching voltage converter operating as an inverter. In other words, for $V_{IN}$ positive, $V_{OUT}$ will be negative. The basic operation of a switching voltage inverter, of which FIG. 5 represents an improvement over, is well known in the art and operates on the same principle as the step up voltage converter; namely that the inductor forming part of its circuit will tend to maintain current flow constant during switching changes and an induced voltage proportional to Ldi/dt will be present in the circuit. Thus, in FIG. 5 when semiconductor switch 44 is closed, a relatively large current will flow through inductor 46 due to the low resistance path to ground 47. Diode 50 is reverse biased due to the positive voltage applied by $V_{IN}$. When switch 44 is opened the decreasing current through inductor 46 results in an induced voltage proportion to Ldi/dt, diode 50 becomes forward biased and negative $V_{OUT}$ is provided. This current flow will also charge the bottom plate 60 of capacitor 48 positively and the upper plate 62 negatively. Capacitor 48 provides a smoothing function by maintaining $V_{OUT}$ during the period switch 44 is closed.

The operation of the present invention as disclosed in the embodiment of FIG. 5 in a switching voltage inverter application is essentially the same as in the step up converter application, i.e., voltages available in the circuit are tested to determine the voltage to be used to drive the semiconductor switch 44. In a voltage inverter application, however, $V_{OUT}$ is compared to ground to determine which is more negative and the more negative of $V_{OUT}$ and ground is then supplied to the switching logic 49 which supplies the drive signal along line 51 to the gate of p-channel MOSFET switch 44. Switch 44, being a p-channel MOSFET in this specific embodiment, will in general have a decreased voltage drop and less power loss for increased gate to source voltage difference. Therefore, as in the case of the step up voltage converter the efficiency of the circuit will be increased by increasing the gate to source drive signal; the specific increase depending on the specific voltage range and device charateristics.

Referring to FIG. 5, the operation of the embodiment shown is analogous to that of the step up converter application shown in FIG. 4. Comparator 52 compares $V_{OUT}$ and ground to determine which is more negative. Two n-channel MOSFETs 54 and 56 are employed in a manner analogous to the 2 p-channel MOSFETS shown in FIG. 4. A parasitic NPN transistor 58 is explicitly shown across MOSFET 54 in diode connected form. As in the case of the parasitic transistor in the p-channel MOSFET of FIG. 4, the parasitic transistor 58 is inherently present due to the fabrication of the n-channel MOSFET 54, although in a normal application it is not active.

During initial start-up of the switching voltage inverter of FIG. 5, the parasitic NPN transistor 58 operating as a diode will provide the ground potential plus the diode voltage drop of transistor 58 to the switching logic 49 and n-channel MOSFET switch 44. As the circuit commences operating comparator 52 will be turned on. Initially ground will be more negative than $V_{OUT}$ and comparator 52 will enable first MOSFET 54 thereby providing the ground potential plus the device voltage drop to the switching logic 49 and switch 44. In the monolithic IC application, the ground potential will be provided to the appropriate n-channel substrates. As $V_{OUT}$ becomes more negative than ground, comparator 52 will switch off first n-channel MOSFET 54 and turn on second n-channel MOSFET 56 via the inverter 60. Second MOSFET 56 provides $V_{OUT}$ plus the voltage drop across second MOSFET 56 to switching logic 49 and switching logic 49 in turn selectively applies this along line 51 to drive switch 44. The gate to source drive signal potential in switch 44 will therefore be the potential difference between $V_{IN}$ (positive) and the more negative of $V_{OUT}$ and ground (ignoring any losses in the switching logic 49). This maximizes the drive to switch 44 thereby reducing power loss in switch 44 and increasing the circuit efficiency. In the monolithic CMOS IC application the n-channel substrates will be at the more negative of $V_{OUT}$ and ground, assuring maximum gate to source drive signal to all the MOSFET elements and the optimum efficiency of the switching voltage inverter system.

While the present invention has been described in terms of preferred embodiments in step up and inverting switching voltage converter applications, it will be appreciated that the present invention is equally applicable to other switching voltage converter uses and circuit topologies. Also, while the preferred embodiments described above have been in the context of switching voltage converter systems employing a single semiconductor switch, the present invention is equally suitable to systems employing more than one switch such as transformer-coupled push-pull DC-to-DC converter systems. Furthermore, while the above-described preferred embodiments employ MOSFET switches, the present invention is equally applicable to switching voltage converters employing bipolar or JFET switches. The necessary design changes in the circuitry will be apparent to one skilled in the art. Similarly, although the MOSFETs illustrated in the preferred embodiments have been enhancement type, depletion type MOSFETs could also be employed, with appropriate changes in the circuit design.

It will be apparent to one skilled in the art that other changes in the details of the preferred embodiments described above may be made and such alternate embodiments are within the scope of the present invention. Thus, the present invention is not intended to be limited to the above described preferred embodiment and is instead best described by the following claims.

What is claimed is:

1. A switching voltage converter system comprising:
   voltage input means for receiving an input voltage;
   semiconductor switch means coupled to said voltage input means for selectively allowing current flow through said switch means;
   switch drive logic means coupled to said switch means for supplying a drive signal to said semiconductor switch means and causing the selective operation thereof;
   voltage output means coupled to said semiconductor switch means for providing an output voltage; and
   selective voltage supply means coupled to said voltage input means and said voltage output means for supplying the greater of said input voltage and said output voltage to said switch drive logic means wherein the drive signal to said switch means may be maximized to reduce energy losses through said switch means.

2. A switching voltage converter system as set out in claim 1 wherein said selective voltage supply means further comprises:
   comparator means for comparing said input voltage and said output voltage and supplying a first signal when said input voltage is greater than said output voltage and a second signal when said input voltage is less than said output voltage;
   first semiconductor means responsive to said comparator means for supplying said input voltage to said switch drive logic means upon receipt of said first signal; and
   second semiconductor means responsive to said comparator means for supplying said output voltage to said switch drive logic means upon receipt of said second signal.

3. A switching voltage system as set out in claim 2 wherein said first semiconductor means comprises a first MOS transistor and said second semiconductor means comprises a second MOS transistor and an inverter connected in series with the gate of said second MOS transistor.

4. A switching voltage converter system as set out in claim 1 wherein said selective voltage supply means comprises a diode coupling said voltage input means and said switch drive logic means and a conductive line coupling said voltage output means and said switch drive logic means.

5. A switching voltage converter system comprising:
   voltage input means for receiving an input voltage;
   switching means having an input terminal, said switching means coupled to said voltage input means for selectively allowing current flow therethrough in response to a signal supplied to said input terminal;
   voltage output means coupled to said switching means for providing an output voltage; and
   means coupled to said voltage input means and said voltage output means for selectively providing the greater of said input voltage and said output voltage to said input terminal of said switching means to drive said switching means.

6. A switching voltage converter system as set out in claim 5 wherein said means for selectively providing comprises first voltage supply means for providing voltage from said voltage input means when said input voltage exceeds said output voltage and second voltage supply means for providing voltage from said voltage output means when said output voltage exceeds said input voltage.

7. A switching voltage converter system as set out in claim 5 wherein said means for selectively providing comprises:
   comparator means for comparing said input voltage and said output voltage and supplying a first signal when said input voltage is greater in magnitude than said output voltage and a second signal when said output voltage is greater in magnitude than said input voltage;
   first semiconductor means responsive to said comparator means for providing said input voltage to said switching means during start up of the converter system and thereafter in response to said first signal; and
   second semiconductor means responsive to said comparator means for providing said output voltage to said switching means in response to said second signal.

8. A switching voltage converter system as set out in claim 7 wherein said second semiconductor means includes a first MOS transistor and an inverter connected in series with the gate thereof and wherein said first semiconductor means comprises a second MOS transistor having a parasitic bipolar transistor connected in diode form across the source and drain of said second MOS transistor.

9. A switching voltage converter system comprising:
   a voltage input for receiving an input voltage;
   an inductor coupled to said voltage input;
   a semiconductor switch coupled to said inductor and system ground for selectively allowing current flow through said inductor between said voltage input and the system ground;
   logic means coupled to said switch for selectively opening and closing said switch by providing a drive signal thereto;

a voltage output coupled to said inductor and capacitively coupled to said switch and system ground for outputting an output voltage;

a comparator coupled to said voltage input and said voltage output for comparing the magnitude of said input voltage and said output voltage and providing a first signal when said input voltage exceeds said output voltage and a second signal when said output voltage exceeds said input voltage;

a first semiconductor device coupled to said voltage input and said logic means and responsive to said comparator for supplying voltage to said logic means from said voltage input upon start up of the converter system and thereafter upon receipt of said first signal; and a second semiconductor device coupled to said voltage output and said logic means and responsive to said comparator for supplying voltage to said logic means from said voltage output upon receipt of said second signal.

10. In a dc voltage converter circuit of the type to which an input voltage $V_{in}$ is applied to an input terminal and in which there is an output voltage $V_{out}$ provided at an output terminal, and which has, operatively connected between the input terminal and the output terminal an inductor, a rectifier and a voltage controlled semiconductor switch having a gate terminal and source and drain terminals connected in series with said rectifier, wherein said switch is operated at a certain duty cycle and said inductor, rectifier and switch cooperate to supply at the output terminal a dc voltage, the improvement comprising:

means for selectively delivering to the gate terminal of said semiconductor switch the greater one of said output voltage $V_{out}$ and said input voltage $V_{in}$ as measured respectively with respect to the source terminal of said semiconductor switch as a reference.

* * * * *